(12) United States Patent
Martin

(10) Patent No.: US 10,303,903 B2
(45) Date of Patent: May 28, 2019

(54) COUNTERMEASURES FOR FAULT-INJECTION ATTACKS BY OPTICAL AND ELECTROMAGNETIC PULSES

(71) Applicant: INSIDE SECURE, Meyreuil (FR)

(72) Inventor: Michel Martin, Rognes (FR)

(73) Assignee: INSIDE SECURE, Meyreuil (FR)

( * ) Notice: Subject to any disclaimer, the term of this patent is extended or adjusted under 35 U.S.C. 154(b) by 0 days.

(21) Appl. No.: 15/947,379

(22) Filed: Apr. 6, 2018

(65) Prior Publication Data

US 2018/0232542 A1     Aug. 16, 2018

Related U.S. Application Data

(63) Continuation of application No. PCT/FR2016/052522, filed on Oct. 3, 2016.

(30) Foreign Application Priority Data

Oct. 6, 2015 (FR) .................................. 15 59497

(51) Int. Cl.
*G06F 21/87* (2013.01)
*G06F 21/86* (2013.01)
*H01L 23/00* (2006.01)

(52) U.S. Cl.
CPC .............. *G06F 21/86* (2013.01); *G06F 21/87* (2013.01); *H01L 23/576* (2013.01)

(58) Field of Classification Search
CPC ....................................................... G06F 21/87
See application file for complete search history.

(56) References Cited

FOREIGN PATENT DOCUMENTS

| FR | 2985059 A1 | 6/2013 |
| WO | 03102510 A2 | 12/2003 |

OTHER PUBLICATIONS

WO 03/102510 A2; Shapiro Yigal; Elbaum Reuven; Prevention of tampering in electronic devices; (Year: 2003).*
FR 2985059 A1; Jun. 28, 2013; Inventor: Giraud Christophe; Morin Nicolas; (Year: 2013).*
EM attack is non-invasive? Design Methodology and Validity verification of EM attack sensor; (Year: 2014).*
English Translation of International Search Report and Written Opinion for PCT Application No. PCT/FR2016/052522, dated Jan. 11, 2017, 8 pages.

(Continued)

*Primary Examiner* — Dharti H Patel
(74) *Attorney, Agent, or Firm* — Brake Hughes Bellermann LLP

(57) ABSTRACT

In a general aspect, an integrated circuit can include a network configured to detect fault-injection attacks on the integrated circuit, the network including a plurality of optical sensors. The integrated circuit can also include a surveillance flip-flop coupled with the network, the surveillance flip-flop being configured to signal a fault when one or more optical sensors of the plurality of optical sensors changes state. The integrated circuit can further include at least one inductive winding included in the network, the at least one inductive winding being configured to generate an induced voltage that causes switching of at least one optical sensor of the plurality of optical sensors when the at least one inductive winding is subjected to an electromagnetic flux capable of causing a fault-injection in the integrated circuit.

7 Claims, 1 Drawing Sheet

(56) References Cited

OTHER PUBLICATIONS

Homma, et al., "EM Attack Is Non-Invasive?—Design Methodology and Validity Verification of EM Attack Sensor", International Association for Cryptologic Research, Jul. 11, 2017, pp. 1-16, vol. 20140718:070507, XP061016639.

* cited by examiner

COUNTERMEASURES FOR FAULT-INJECTION ATTACKS BY OPTICAL AND ELECTROMAGNETIC PULSES

CROSS REFERENCE TO RELATED APPLICATIONS

This application is a continuation of, and claims priority to, PCT Application No. PCT/FR2016/052522, filed Oct. 3, 2016, which claims priority to French Application No. 1559497, filed Oct. 6, 2015, this disclosures of both applications are incorporated here in by reference in their entireties.

FIELD OF THE INVENTION

This disclosure relates to the prevention of fault-injection attacks in secure integrated circuits.

BACKGROUND

A fault-injection may be caused by an inadvertent switching of the logic state of a digital circuit block in an integrated circuit in operation. Such switching may be deliberately provoked by means of a laser beam directed on the drain or the source of a MOS transistor, or by means of an electromagnetic field directed through a loop formed by conductive tracks interconnecting elementary logic gates or transistors inside an elementary gate. By injecting faults at strategic points, in synchronization with the operation of a secure circuit, an attacker can reveal secure information, such as encryption keys.

To detect laser beam attacks, the circuit may be provided with optical sensors distributed in the circuit, with a higher density around key elements of the circuit.

For example, such sensors can be implemented in buffer amplifiers provided in the reset tree of the integrated circuit. A buffer amplifier can be formed of two consecutive inverters, each being sensitive to laser beam fault-injection. The outputs of these amplifiers, at logic 1 in normal operation, are compared by an AND gate. When at least one of the buffer amplifiers switches due to a fault-injection, the output of the AND gate temporarily changes to logic 0. This passage through a logic 0 is stored in a flip-flop that serves to signal the fault. The signal indicating the fault may be used by software for taking preventive measures, or simply to reset the circuit.

In practice, it is difficult to protect, using optical sensors, all locations in a secure circuit that can be used for fault-injection and optical sensors are generally not suited for the detection of electromagnetic pulses. As a consequence, secure circuits may integrate other countermeasures to prevent attacks, such as the use of redundancy, allowing double verification of results.

SUMMARY

In a general aspect, an integrated circuit can include a network configured to detect fault-injection attacks on the integrated circuit, the network including a plurality of optical sensors. The integrated circuit can also include a surveillance flip-flop coupled with the network, the surveillance flip-flop being configured to signal a fault when one or more optical sensors of the plurality of optical sensors changes state. The integrated circuit can further include at least one inductive winding included in the network, the at least one inductive winding being configured to generate an induced voltage that causes switching of at least one optical sensor of the plurality of optical sensors when the at least one inductive winding is subjected to an electromagnetic flux capable of causing a fault-injection in the integrated circuit.

BRIEF DESCRIPTION OF DRAWINGS

Embodiments described herein are given by way of non-limiting examples in relation to the accompanying drawings.

DETAILED DESCRIPTION

Optical sensors formed from buffer amplifiers in a reset tree are subject to design constraints of the corresponding reset tree, especially in terms of number of sensors and their placement. This limits the coverage possibilities of injection fault risk areas.

Figure 1:
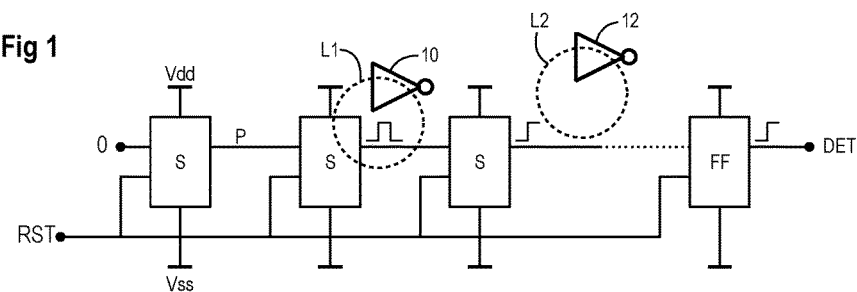
FIG. 1 is a diagram that schematically illustrates a network of optical sensors that may be used to detect laser beam fault-injection attempts in an integrated circuit in operation.

FIG. 1 is a diagram that schematically illustrates a network of independent optical sensors S, which are not subject to design constraints of other elements. Their structure, their location and their number are thus free and adaptable to the specific needs of a circuit to be protected.

The sensors S are chained, that is to say that each sensor has a propagation input that is connected to a propagation output P of a previous sensor. The propagation input of a first sensor S is connected to a logic level representative of normal operation, for example logic 0. The propagation output of the last sensor is connected to a surveillance flip-flop FF connected to store any passage through an active state of the propagation output of the last sensor S. The surveillance flip-flop FF produces a fault detection signal DET. The sensors S and the surveillance flip-flop FF may be powered between supply lines Vdd and Vss of a corresponding integrated circuit.

Each of the sensors S can be configured to relay any activation of its propagation input to the next sensor and to be sensitive to fault-injections, which faults can be reflected in the propagation output of the sensor.

For this purpose, the sensors S could be simple buffer amplifiers. Then any sensor of the chain which receives a laser flux can produce a pulse on its output which is propagated from sensor to sensor to the flip-flop FF. The pulse can cause the change of state of the flip-flop FF and the signaling of a fault.

Since the sensor chain can be long and the fault-injection can be short, the propagated pulse could be attenuated or lost in some cases. Therefore, it may be preferable that the sensors propagate a state rather than a pulse. Therefore, each sensor S may include a flip-flop that switches to an active state at the appearance of an active edge on the propagation input. The active state of the first sensor that switches can then be propagated from sensor to sensor to the surveillance flip-flop FF.

If the sensors S integrate flip-flops, these flip-flops and the flip-flop FF may be connected to be reset by a global reset signal RST of the integrated circuit.

Depending on their structure, the optical sensors S may also be sensitive to electromagnetic pulse attacks.

In FIG. 1, the second sensor S of the chain is located near an inverting structure 10 of the integrated circuit. The inverter 10 can be targeted by an optical or electromagnetic flow L1 which overlaps the second sensor. The proximity can be such that the flow injects a fault in this sensor, resulting in a pulse that is propagated to the flip-flop FF indicating a corresponding fault detection.

Another inverter 12 (targeted by a flow L2) may be too far from a sensor S, such that no sensor generates a pulse, and no fault is detected.

Figure 2:
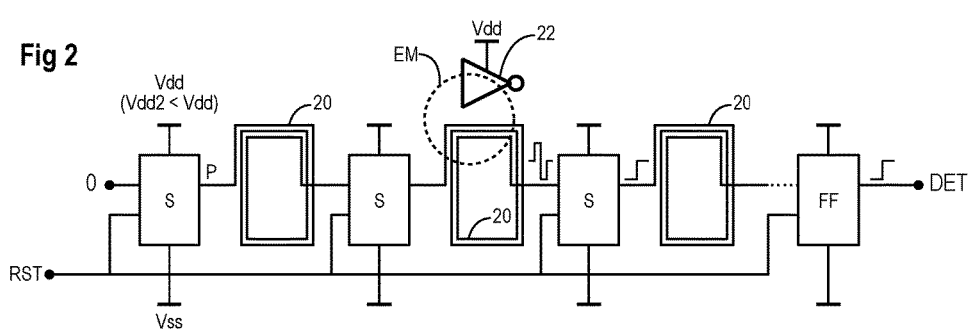
FIG. 2 is a diagram that schematically illustrates a network of optical and electromagnetic sensors that may be used to detect fault-injection attempts, both by laser beams and electromagnetic pulses.

FIG. 2 schematically shows a sensor chain embodiment configured to provide an associated integrated circuit with an increased fault coverage rate for electromagnetic pulse attacks. As shown in FIG. 2, inductive windings 20 are inserted in series in the links P between the sensors S of the chain of FIG. 1. The windings 20 may be tracks wound in flat spirals on a last metal level of an integrated circuit. These windings 20 may thus be placed over active elements of the circuit without increasing a surface area of the integrated circuit. Each winding may, therefore, surround several neighboring sensitive areas to protect.

Each inductive winding 20 may be configured to generate an induced voltage exceeding a switching threshold of a logic gate when the winding 20 is subjected to an electromagnetic flux likely to cause a fault-injection in a circuit to be protected. Thus, when a sensitive area of the circuit, such as an inverting structure 22, is targeted by an electromagnetic pulse EM, the pulse flux may overlap the nearest winding 20, or even traverse the winding 20 if the winding 20 surrounds the targeted area. A winding terminal connected to the input of the next sensor S, which is at high impedance, can then receive an induced voltage pulse. The pulse is generally bipolar, including two peaks of opposite polarities, as shown—the peak having the appropriate polarity then triggers the next sensor S. This event propagates from sensor to sensor up to the flip-flop FF that signals a fault.

In some implementations, depending on the structure of the optical sensors S, the windings 20 may be connected elsewhere than between two sensors S.

Figure 3:
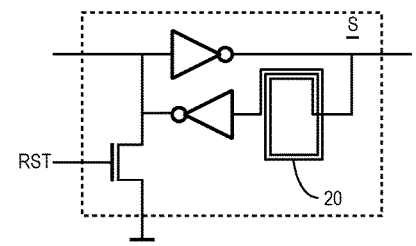
FIG. 3 is a diagram that schematically illustrates a latching optical sensor, and a connection of an electromagnetic pulse detection winding.

FIG. 3 schematically illustrates a latch that can implement an optical sensor S, such as the optical sensors S of FIG. 2. The latch includes two head-to-tail inverters forming an SRAM memory cell. A MOS transistor may be provided to reset the latch from a signal RST. An inductive winding 20 may be connected between an output of a first of the inverters and an input of the second inverter. The winding 20 may be connected, as shown, outside the propagation path between the sensors S, so that the winding 20 does not affect the propagation signal.

Electromagnetic pulses used to inject faults can be of high intensity, capable of generating an induced voltage exceeding the switching threshold of an elementary gate with a single loop of arbitrary configuration and discontinuous between elements of the elementary gate. Thus, the windings 20 may not need to have a high inductance to detect such pulses. However, the windings 20 may be configured to be sensitive to a fraction of the flux of an electromagnetic pulse, so that they can detect pulses in locations that are offset with respect to the windings 20, targeting areas outside the windings 20.

For example, an inductance of about 3 nH can achieve satisfactory results. This inductance value can be achieved using a square flat spiral winding of about 250 μm, with three turns. Instead of being wound in a spiral on a single layer of metal, the turns of such a square flat spiral winding can be wound on different metal layers to form a solenoid winding, the size of which can be smaller than that of a spiral winding for the same inductance value.

As previously indicated, a criterion involved in the design of the windings 20 is the production of an induced voltage exceeding the switching threshold of an elementary logic gate. Indeed, it is the crossing of this threshold at the input of a sensor S which causes the propagation of the event to signal a fault. It may be desirable to lower this threshold to make the sensors more sensitive. This can be achieved by lowering the supply voltage of the sensor chain S and the flip-flop FF—while the integrated circuit, including the inverter 22, is supplied with a voltage Vdd, the sensor chain S can be powered at a voltage Vdd2 lower than the voltage Vdd, as indicated in parentheses for the first sensor S in FIG. 2.

Figure 4:
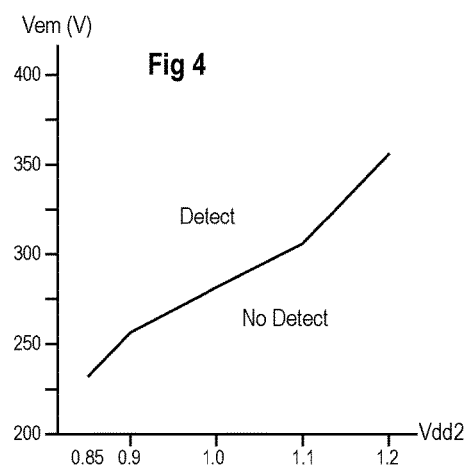
FIG. 4 is a graph illustrating sensitivity improvements of sensors as a function of supply voltage.

FIG. 4 is a graph showing simulation results, where the simulation results illustrate the sensitivity of the sensors S as a function of the supply voltage Vdd2. The graph of FIG. 4 was established using a winding 20 with an inductance of 3 nH, an electromagnetic pulse probe of 100 nH, and a coupling coefficient between the probe and the winding 20 of 0.01. The vertical axis in FIG. 4 represents amplitudes of the voltage pulses Vem applied to the probe, and therefore, intensity of the magnetic flux of the pulses.

Under these simulation conditions, for a voltage Vdd2 equal to the supply voltage Vdd, here 1.2 V, a voltage Vem greater than 350 V is required on the probe to trigger the detection. When the voltage Vdd2 is lowered to 0.85 V, a voltage Vem of the order of 230 V is sufficient to trigger the detection.

In the embodiment of FIG. 2, the windings 20 have been inserted in series in the propagation lines P between the sensors. In some implementations, the windings 20 may be inserted in other lines of the sensor interconnection network, as long as the voltage induced in a given winding 20 causes a detection condition in one of the sensors S.

Figure 5:
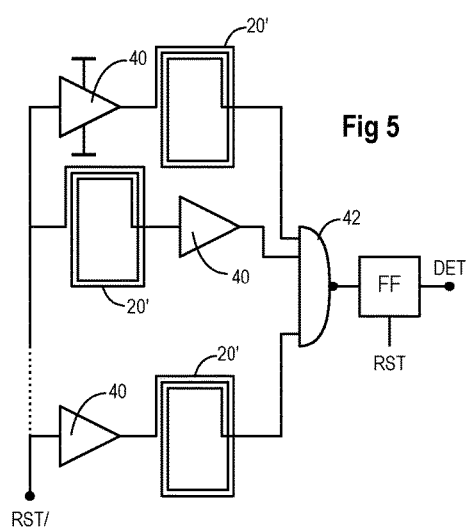
FIG. 5 is a diagram that schematically illustrates another embodiment of a network of optical and electromagnetic sensors.

FIG. 5 schematically illustrates another embodiment of a sensor network illustrating other possible locations of the windings 20. The sensor network of FIG. 5 can be implemented, for example, in a network of buffer amplifiers 40 belonging to a reset tree of an integrated circuit.

In the example of FIG. 5, the amplifiers 40 can all receive an active-low reset signal RST/, either directly, as shown, or relayed by another amplifier. The outputs of the amplifiers 40, serving as sensors S, are connected to respective inputs of a NAND gate 42. The output of the NAND gate 42 is connected to the surveillance flip-flop FF.

In such a structure, electromagnetic flux detection windings 20' may be inserted in series, as shown, in the conductors, or signal paths between the line RST/ and the amplifiers 40, or between the amplifiers 40 and the gate 42. Another winding 20' could be inserted between the gate 42 and the flip-flop FF.

With this configuration, a winding 20' subjected to an electromagnetic pulse can generate an induced voltage pulse on its high impedance terminal. This pulse can then be transmitted to an input of the gate 42, either directly or via an amplifier 40. In this example, all of the inputs of the gate 42 are normally at 1, placing the output of the gate at 0. During the negative peak of the pulse, the corresponding input of the gate 42 is pulled towards 0, causing the gate output to go to 1, and the detection of the event by the flip-flop FF.

In fact, the sensor network of FIG. 4 is implemented as a parallel network, while the sensor network of FIGS. 1 and 2 is implemented as a serial network. Whatever the structure of the sensor network, it should be configured to connect each inductive winding 20 or 20' in series with a sensor S to achieve the desired functionality. For instance, the windings may also be connected between elements of the sensors S themselves (e.g., such as in FIG. 3).

What is claimed is:

1. An integrated circuit comprising:
   a network configured to detect fault-injection attacks on the integrated circuit, the network including a plurality of optical sensors;
   a surveillance flip-flop coupled with the network, the surveillance flip-flop being configured to signal a fault when one or more optical sensors of the plurality of optical sensors changes state; and
   at least one inductive winding included in the network, the at least one inductive winding being configured to generate an induced voltage that causes switching of at least one optical sensor of the plurality of optical sensors when the at least one inductive winding is subjected to an electromagnetic flux capable of causing a fault-injection in the integrated circuit.

2. The integrated circuit of claim 1, wherein an inductive winding of the at least one inductive windings is coupled in series with a respective optical sensor.

3. The integrated circuit of claim 1, wherein an optical sensor of the plurality of optical sensors includes a latch and an inductive winding of the at least one inductive windings is coupled between elements of the latch.

4. The integrated circuit of claim 1, wherein the at least one inductive winding is flat and formed by tracks wound in a spiral on a metal level of the integrated circuit.

5. The integrated circuit of claim 1, wherein the at least one inductive winding is a solenoid formed by tracks wound on different metal levels of the integrated circuit.

6. The integrated circuit according to claim 1, wherein the plurality of optical sensors are powered at a voltage lower than a nominal power supply voltage of the integrated circuit.

7. The integrated circuit of claim 1, wherein the plurality of optical sensors are coupled in a chain and the at least one winding is inserted in a link between a first optical sensor and a second optical sensor of the plurality of optical sensors.

* * * * *